United States Patent [19]
Matsumoto

[11] Patent Number: 4,722,079
[45] Date of Patent: Jan. 26, 1988

[54] OPTICAL DISK PLAYER CAPABLE OF DISTINGUISHING EXTERNAL DISTURBANCES AND LOCAL DEFECTS AND ADJUSTING SERVO GAIN ACCORDINGLY

[75] Inventor: Keiichi Matsumoto, Saitama, Japan

[73] Assignee: Pioneer Electronic Corporation, Japan

[21] Appl. No.: 760,858

[22] Filed: Jul. 31, 1985

[30] Foreign Application Priority Data

Jul. 31, 1984 [JP] Japan .................. 59-159301

[51] Int. Cl.$^4$ .................................. G11B 7/00
[52] U.S. Cl. ............................ 369/44; 369/45; 250/201
[58] Field of Search ................. 369/43, 44, 45, 46, 369/53, 32, 33; 250/201 DF; 358/342

[56] References Cited

U.S. PATENT DOCUMENTS 4,310,912  1/1982  Kikuchi .................. 369/43

Primary Examiner—Robert L. Richardson
Attorney, Agent, or Firm—Sughrue, Mion, Zinn, Macpeak, and Seas

[57] ABSTRACT

In a three-beam type optical data disk player, beam output disturbances due to an external disturbance such as vibration and the beam output disturbances due to a local defect on the disk are distinguished from each other, and the servo gain is adjusted according to whether the beam output disturbance is due to the external disturbance or due to the local defect, so that the main beam is controlled to correctly follow the track at all times.

10 Claims, 14 Drawing Figures

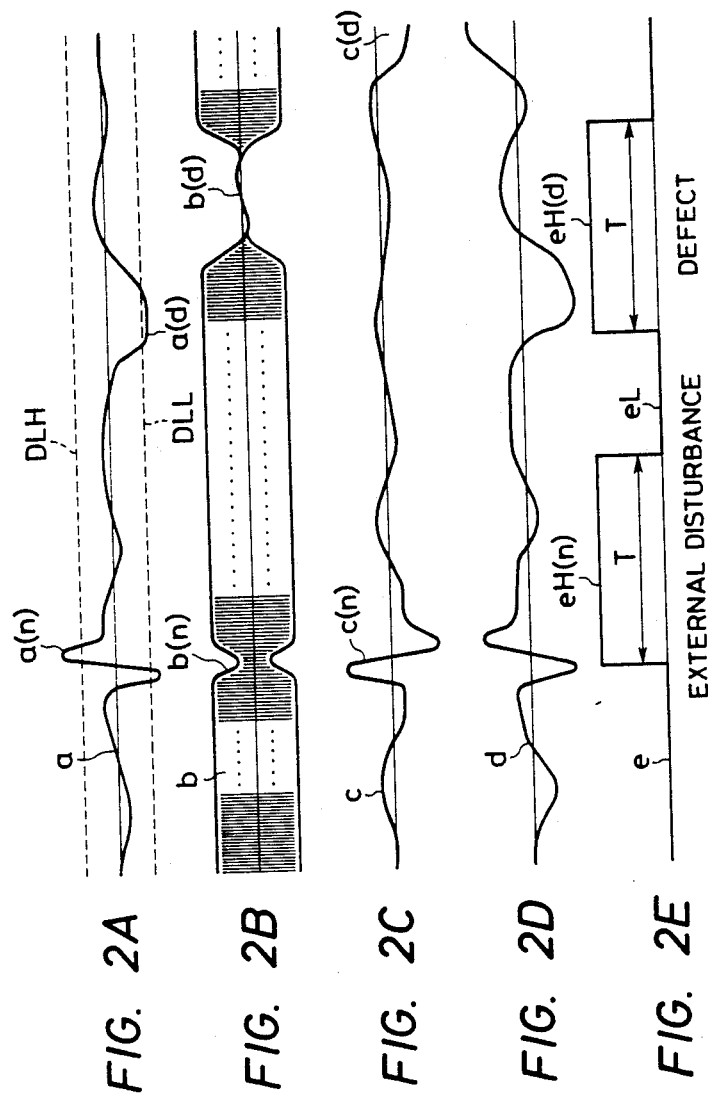

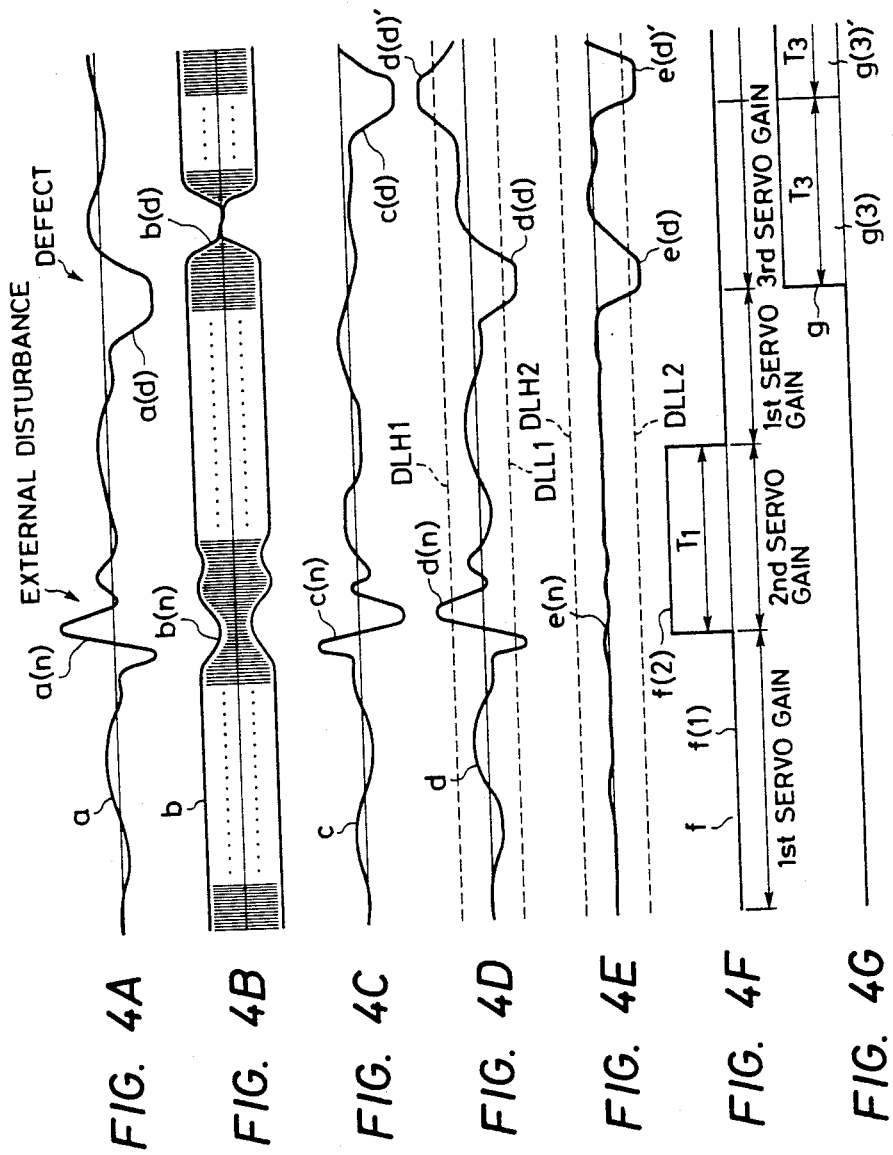

OPTICAL DISK PLAYER CAPABLE OF DISTINGUISHING EXTERNAL DISTURBANCES AND LOCAL DEFECTS AND ADJUSTING SERVO GAIN ACCORDINGLY

BACKGROUND OF THE INVENTION

The present invention relates to a three-beam type optical data disk player with a servo circuit in which three optical beams including a main optical beam are used, and the main optical beam is caused to correctly follow the track on the disk to read data recorded on the disk.

In order to correctly read data from a disk with an optical data disk player, it is essential to cause the reading light beam to correctly follow the track on the disk. To do so either a single-beam system can be employed in which a single reading light beam is used, or a so-called three-beam system can be employed in which two auxiliary light beams are provided which are directed onto points on the disk before and after the main light beam.

FIG. 1 shows an example of a conventional three-beam type optical data disk player. In FIG. 1, reference numeral 11 designates a track on a disk; 12, a main beam for reading the data recorded on the disk; 13, a front beam directed in front of the main beam 12 for generating a signal utilized to form a radial error signal used to control the main beam 12 to follow the track 11; 14, a rear beam directed to the rear of the main beam and used for generating a signal utilized to form a radial error signal; 15, a main beam preamplifier for amplifying data signals read by the main beam 12; 16, a front beam preamplifier for extracting a low frequency component from the signal detected by the front beam and amplifying that component; and 17, a rear beam preamplifier for extracting a low frequency component from the signal detected by the rear beam and amplifying that component.

Further in FIG. 1, reference numeral 18 designates a differential amplifier for obtaining the difference between the outputs of the front beam preamplifier and the rear beam preamplifier so as to form a so-called radial error signal; 19, a radial servo receiving the radial error signal from the differential amplifier 18 and driving a radial actuator 20 to cause the main beam to follow the central line of the track 11; 20, the aforementioned radial actuator for causing the main beam 12 to follow the central line of the track 11; and 21, a servo gain control circuit for, in response to the output of the front beam preamplifier, controlling the servo gain of the radial servo circuit 19.

The operation of the disk player shown in FIG. 1 will be described with reference to the operating waveform diagram of FIGS. 2A through 2E. A data signal recorded on the track 11 is read by the main beam 12 and amplified by the main beam preamplifier 15, then outputted as a high frequency signal (RF signal) b as indicated in FIG. 2B. The high frequency signal is converted into an audio signal by a demodulating circuit, error correcting circuit, and D/A converter (not shown).

Further, the front beam preamplifier and the rear beam preamplifier extract the low frequency components from the signals read with the front beam 13 and the rear beam 14 and output those components as radial error detection signals a and c, as shown in FIGS. 2A and 2C, respectively. The differential amplifier 18 obtains the difference between the radial error detection signals a and c to form a radial error signal d, as shown in FIG. 2D. The radial error signal d is applied to the radial servo circuit 19. In response to the radial error signal d, the radial servo circuit 19 drives the radial actuator 20 so that the main beam 12 is moved, that is, made to follow the central line of the track 11.

At the same time, the radial error detection signal a of the front beam preamplifier 16 is applied to the servo gain control circuit 21. The servo gain control circuit 21 produces a gain control signal e which, when the radial error detection signal a exceeds a predetermined detection level DLH or DLL, as shown in FIG. 2A, is at a second gain setting level eH, namely, a high level for a certain period of time T, and is at a first gain setting level eL, namely, a low level, in the other cases. The gain control signal e thus produced is applied to the radial servo circuit 19. When the radial servo circuit 19 receives the first gain setting level eL from the servo gain control circuit 21, the servo gain of the circuit 19 is set to a first servo gain value, namely, a predetermined low gain. In contrast, when the radial servo circuit 19 receives the second gain setting level eH from the servo gain control circuit 21, the servo gain of the circuit 19 is set to a second servo gain value, higher than the first servo gain value, so that the servo control capability of the circuit 19 is increased.

In the case where no external disturbance exists and the disk has no local defect, only residual errors such as errors due to disk eccentricity occur. Therefore, in this case, the output a read with the front beam 13 never exceeds the detection level DLH or DLL. Accordingly, the servo gain control circuit 19 continuously outputs the first gain setting level eL (low level) so that the servo gain of the radial servo circuit is set to the first servo gain value.

When an external disturbance such as vibration is applied to the optical data disk player, the three beams are moved in the same direction. It is assumed that the main beam 12 is moved towards the left in FIG. 1. In this case, the part of the front beam on the track 11 is increased, while the part of the rear beam on the track 11 is decreased. The part a(n) of the radial error detection signal a in FIG. 2A, and the part c(n) of the radial error detection signal c in FIG. 2C indicate radial error detection signals caused by such an external disturbance. In this case, the level of the radial error detection signal a outputted by the front beam preamplifier 16 exceeds the detection levels DLH and DLL, and therefore the servo gain control circuit 21 outputs the second gain setting level eH(n) (high level), as shown in FIG. 2E. The second gain setting level, applied to the radial servo circuit 19, cause the servo gain of the latter to be set to the predetermined second servo gain value for the predetermined period of time T, and thus the external disturbance eliminating capability is increased. As a result, the radial actuator is driven so as to return the main beam 12 to the central line of the track 11.

In the case where the disk has a local defect, the front beam 13, the main beam 12 and the rear beam 14 pass through the local defect in the stated order. Therefore, as indicated at a(d) in FIG. 2A, at b(d) in FIG. 2B, and at c(d) in FIG. 2C, first the radial error detection signal a of the front beam preamplifier 16 becomes irregular, then the high frequency signal b of the main beam preamplifier 15 drops out, and finally the output of the rear beam preamplifier 18 becomes irregular.

In the case, the radial error detection signal a of the front beam preamplifier 16 exceeds the detection level DLL. Therefore, as in the case of the abovedescribed external disturbance, the servo gain control circuit 21 outputs the second gain setting level eH(d) so that the radial servo circuit 19 drives the radial actuator 20 with the servo gain increased to the second servo gain for the predetermined period of time T.

As is apparent from the above description, the conventional optical data disk player employs a system whereby the servo gain switching control signal is produced by detecting when the radial error detection signal is produced by detecting when the radial error detection signal a of the front beam preamplifier 16 exceeds the predetermined detection levels. As a consequence, in the conventional optical data disk player, it is impossible to distinguish a radial error detection signal disturbance due to a local disk effect from a disturbance due to an external disturbance, and accordingly in the case of a local defect, as in the case of the external disturbance, the servo gain of the radial servo circuit 19 is increased to the second servo gain. However, the radial error detection signal disturbance due to the local defect occurs completely irrespective of the position of the beam on the track. Accordingly, although the main beam 12 follows the track 11 correctly, the radial actuator is driven in the wrong direction because the servo gain of the radial servo circuit has been increased to the second servo gain as described above. That is, the main beam 12 is caused to jump the track.

SUMMARY OF THE INVENTION

Accordingly, an object of the invention is to eliminate the above-described difficulties accompanying a conventional three-beam type optical data disk player.

The foregoing object and other objects of the invention have been achieved by the provision of a three-beam type optical data disk player which, according to the invention, comprises: an addition circuit for subjecting to addition a low frequency component of an output signal produced in response to the front beam and a low frequency component of an output signal produced in response to the rear beam; a differential amplifier for obtaining the difference between the two low frequency components; a first detection circuit for detecting when the output of the differential amplifier is larger than a first predetermined detection level; a second detection circuit for detecting when the output of the addition circuit is larger than a second predetermined detection level; at least one servo circuit whose servo gain is set to a first predetermined servo gain value, a second servo gain value larger than the first servo gain value, and a third servo gain value smaller than the first servo gain value according to first, second and third control signals which are externally applied to the servo circuit; and a control circuit which receives the outputs of the first and second detection circuits and applies to the servo circuit the second control signal for setting the servo gain of the servo circuit to the second servo gain value when only the first detection circuit provides an output, the third control signal for setting the servo gain of the servo circuit to the third servo gain value when the first and second detection circuits provide outputs, and the first control signal for setting the servo gain of the servo circuit to the first servo gain value when neither of the first and second detection circuits provide outputs.

The nature, principle and utility of the invention will become more apparent from the following detailed description when read in conjunction with the accompanying drawings.

BRIEF DESCRIPTION OF THE DRAWINGS

In the accompanying drawings:

FIGS. 2A through 2E, taken together, are a timing chart for a description of the operation of the player in FIG. 1;

FIGS. 4A through 4G, taken together, are a timing chart for a description of the operation of the player according to the invention;

DESCRIPTION OF THE PREFERRED EMBODIMENTS

An example of a three-beam type optical data disk player constructed according to the invention will be described with reference to FIG. 3.

Figure 1:
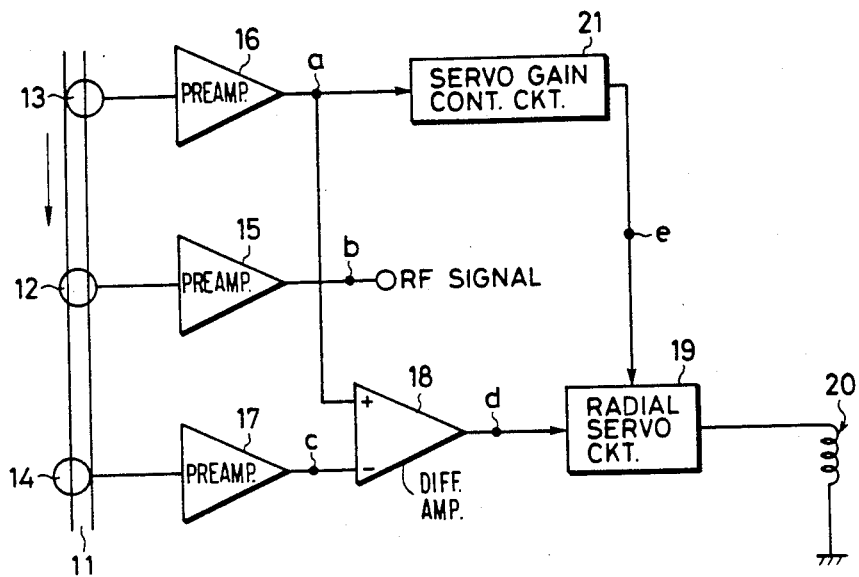
FIG. 1 is a block diagram showing one example of a conventional three-beam type optical data disk player.
Figure 3:
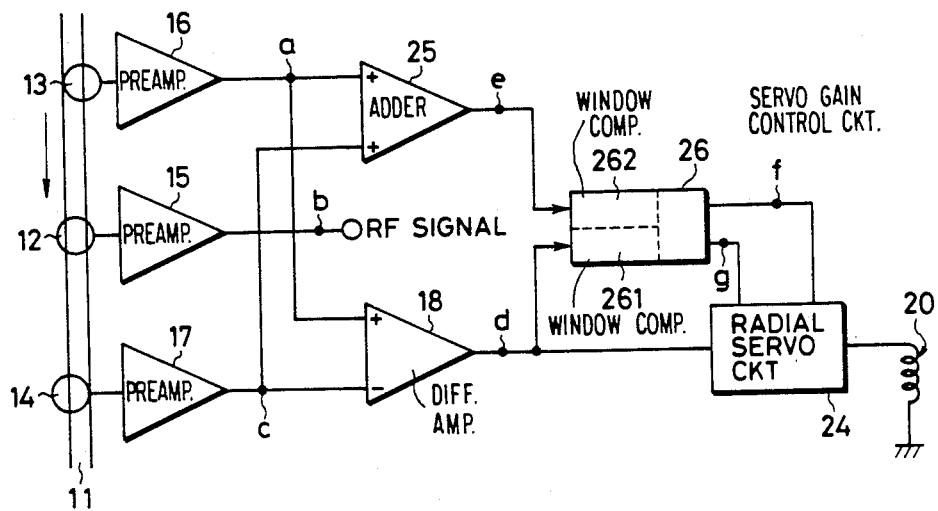
FIG. 3 is a block diagram showing an example of a three-beam type optical data disk player according to the invention.

In FIG. 3, reference numerals used commonly in FIG. 1 denote like components.

Further, in FIG. 3, reference numeral 24 designates a radial servo circuit. The radial servo circuit 24 receives the radial error signal from the differential amplifier 18. In response to a control signal from a servo gain control circuit (described below), the servo gain of the radial servo circuit 24 is set to one of a first servo gain value, a second servo gain value larger than the first servo gain value, and a third servo gain value smaller than the first servo gain value. Further in FIG. 3, reference numeral 25 designates an addition circuit for outputting the result of addition of the radial error detection signals provided by the front beam preamplifier and the rear beam preamplifier; and 26, the aforementioned servo gain control circuit composed of a first window comparator 261 and a second window comparator 262.

In the servo gain control circuit 26, the first window comparator 261 detects when the level of the radial error signal outputted by the differential amplifier 18 is larger than a first detection level, while the second window comparator 262 detects when the output of the addition circuit is larger than a second detection level. When neither of the first and second window comparators 261 and 262 provide an output, the servo gain control circuit 26 produces a control signal to set the servo gain of the radial servo circuit to the first servo gain value. When only the first window comparator 261 provides an output, the control circuit 26 produces a control signal to set the servo gain of the radial servo circuit to the second servo gain value. When both of the first and second window comparators 261 and 262 provide outputs, the servo gain control circuit 26 produces a control signal to set the servo gain of the radial servo circuit 24 to the third servo gain value.

The operation of the disk player thus constructed will be described with reference to the operating waveform diagram of FIGS. 4A through 4G.

The preamplifiers 15, 16 and 17 and the differential amplifier 18 are the same as those in FIG. 1. A data signal recorded on the track 11 is read with the main beam 12. The data signal thus read is amplified by the main beam preamplifier 15 and outputted as a high frequency signal (RF signal) b, as shown in FIG. 4B.

The high frequency signal is converted into an audio signal by a demodulating circuit, error correcting circuit and D/A converter (not shown).

Further, the front beam preamplifier 16 and the rear beam preamplifier 17 extract the low frequency components from the signals read by the front beam 13 and the rear beam 14 and output them as radial error detection signals a and c, as shown in FIG. 4A and 4C. The differential amplifier 18 obtains the difference between these radial error detection signals a and c to form a radial error signal d, as shown in FIG. 4D, which is applied to the radial servo circuit 24. The latter drives the radial actuator 20 according to the radial error signal so that the main beam 12 follows the central line of the track 11. The above-described operations are the same as those of the conventional player shown in FIG. 1.

The radial error signal from the differential amplifier 18 is further applied to the first window comparator 261 in the servo gain control circuit 26. The first window comparator 261, having first detection levels, namely, a high detection level DLH1 and a low detection level DLL1, and detects when the input radial error signal d exceeds the first detection levels. In general, the absolute values of the high and low detection levels DLH1 and DLL1 are equal to each other.

The radial error detection signals a and c provided by the front beam preamplifier 16 and the rear beam preamplifier 17 are applied to the addition circuit 25. The addition output e of the circuit 25 is applied to the second window comparator 262 in the servo gain control circuit 26. The second window comparator 262, having second detection levels, namely, a high detection level DLH2 and a low detection level DLL2, detected when the addition output e exceeds the second detection levels. Usually, the absolute values of the high and low detection levels DLH2 and DLL2 are selected equal to each other.

As described above, when neither of the first and second window comparators 261 and 262 provides an output, the servo gain control circuit 26 produces the control signal which sets the servo gain of the radial servo circuit 24 to the first servo gain value. When only the first window comparator 261 provides an output, the control circuit 26 produces the control signal which sets the servo gain of the radial servo circuit to the second servo gain value. When both the first and second window comparators 261 and 262 provide outputs, the servo gain control circuit 26 produces the control signal which sets the servo gain to the third servo gain value. These control signals are applied to the radial servo circuit 24.

In the case where no external disturbance exists and the disk has no local defect, only residual errors such as eccentric errors occur, and therefore the outputs of the front beam preamplifier 16 and the rear beam preamplifier 17 are low in level. Accordingly, the radial error signal d of the differential amplifier 18 does not exceed the first detection levels DLH1 and DLL1 of the first window comparator 261, and the addition output e of the addition circuit 25 does not exceed the second detection levels DLH2 and DLL2 of the second window comparator 262. Accordingly, the first and second window comparators 261 and 262 provide no outputs. Therefore, the servo gain control circuit 26 sets the gain of the radial servo circuit 24 to the first servo gain value (as indicated as f(1) in FIG. 4F).

When an external disturbance such as vibration is applied to the optical data disk player, the three beams are all moved in the same direction. It is assumed that the beams are moved towards the left in FIG. 3. In this case, the part of the front beam on the track 11 is increased, while the part of the rear beam on the track 11 is decreased. Therefore, the radial error detection signals a of the front beam preamplifier 16 and the radial error detection signal c of the rear beam preamplifier 17 vibrate in phase opposition, as indicated at a(n) in FIG. 4A and c(n) in FIG. 4C. Accordingly, the radial error signal d provided by the differential amplifier 18 becomes greatly disturbed, as indicated at d(n) in FIG. 4D, thus exceeding the first detection levels. As a result, the first window comparator 261 produces the detection output. On the other hand, the radial error detection signals a and c, which are opposite in phase to each other, are subjected to addition by the addition circuit 25. Therefore, the output of the addition circuit 25 is considerably small, as indicated at e(n) in FIG. 4E, thus being lower than the second detection levels. As a result, the second window comparator 262 provides no output. Accordingly, the servo gain control circuit 26 determines that the beam output variation has been caused by an external disturbance, and thus applies the control signal of the second servo gain f(2) (higher than the first servo gain f(1)) to the radial servo circuit 24 for a predetermined period of time $T_1$, as indicated at f(2) in FIG. 4F. When the control signal f(2) is applied to the radial servo circuit 24, the servo gain of the latter is set to the second servo gain value (larger than the first servo gain value) so that the disturbance eliminating capability is increased. As a result, the main beam 12 is quickly returned to the central line of the track 11.

In the case where the disk has a local defect, as indicated at a(d) in FIG. 4A, b(d) in FIG. 4B, and c(d) in FIG. 4C, the radial error detection of the front beam premplifier 16, the radial error detection of the main beam preamplifier 15, and the radial error detection of the rear beam preamplifier 17 become irregular in the stated order. As a result, as indicated at d(d) and d(d)' in FIG. 4D, the radial error signal d of the differential amplifier 18 becomes greatly disturbed, thus exceeding the first detection levels. At the same time, as indicated at e(d) and e(d)' in FIG. 4E, the addition output e of the addition circuit 25 also becomes greatly disturbed, thus exceeding the second detection levels. Accordingly, both the first and second window comparators 261 and 262 provide detection outputs, and therefore the servo gain control circuit 26, determining that the beam output variation is caused by a local defect, applies the control signal for the third servo gains g(3) and g(3)' (which are lower than the first servo gain) to the radial servo circuit 24 for a predetermined period of time $T_3$, as indicated at g(3) and g(3)' in FIG. 4G. When the control signal (g(3) and g(3)') is applied to the radial servo circuit 24, the servo gain of the latter is set to the third servo gain value (smaller than the first servo gain value) so that displacement of the main beam from the present position is prevented.

As is apparent from the above description, the disturbances in the front and rear beam outputs due to the external disturbances and the disturbances in the front and rear beam outputs due to local defects are clearly distinguished from each other according to the invention. In the former case, the servo gain of the radial servo circuit is increased to the second servo gain value, which is higher than the first servo gain value at which the servo gain is normally maintained, so that the disturbance eliminating capability is increased. In the latter case, the servo gain is reduced to the third servo gain value from the first servo gain so that the displacement of the main beam is prevented. Thus, the main beam is made to correctly follow the track.

As described above, the inventive disk player is designed so that, when the servo gain control circuit 26 detects a local defect, the servo gain of the radial servo circuit 24 is set to the third servo gain value (smaller than the first servo gain value at which the servo gain is normally maintained). However, the disk player may be modified so that, when a local defect is detected, nothing is carried out, that is, the third servo gain value is made equal to the first servo gain value, and when an external disturbance is detected, the servo gain is made larger than the first servo gain value. In this case, the effect of preventing the track jumping due to local detects is low compared with that of the conventional optical data disk player; however, this modification results in a much simpler circuit arrangement than in the conventional player. In addition, it should be noted that the modification is substantially equal to the above-described embodiment in the effect of preventing track jumping due to external disturbances.

Furthermore, the above-described optical data disk player of FIG. 3 may be modified so that only when the local defect is detected is the servo gain of the radial servo circuit 24 made smaller than the first servo gain at which the servo gain is normally maintained. In general, an external disturbance lasts only momentarily, and accordingly the beam output disturbance due to the external disturbance is eliminated in a considerably short time, while a beam output disturbance due to a local defect lasts for a longer time. Therefore, a disk player which well prevents the track jumping due to local defects is provided.

In the above-described embodiment, in order to reduce the servo gain of the radial servo circuit when a local defect is detected, the third servo gain value is employed (which is lower than the first servo gain value). However, the radial servo loop of the radial servo circuit 24 may be opened so that inputting the radial error signal d is inhibited.

In the above-described optical data disk player, the servo gain control signal is applied only to the radial servo circuit. However, if the servo gain control signal is applied to a focus servo circuit in addition to the radial servo circuit, then not only can track jumping be prevented, but also defocusing is eliminated.

As is apparent from the above description, in the three-beam type optical data disk player according to the invention, the facts that the front beam output and the rear beam output change in phase opposition when an external disturbance such as vibration occurs, and that the front beam output is disturbed first when the disk has a local defect, are utilized to distinguish beam output disturbances due to external disturbances and those due to local defects. In the case of an external disturbance, the servo gain is increased, and in the case of a local defect, track jumping of the main beam is positively prevented, that is, the track is correctly followed by the main beam. Furthermore, defocusing of the main beam is prevented by the servo gain control of the focus servo circuit.

What is claimed is:

1. A three-beam type optical data disk player in which front, main and rear beams are directed onto a recorded track and respective first, second and third signals are produced in response to light reflected by said track from said front, main and rear beams, comprising: a servo circuit for controlling a position of said main beam in response to said first and third signals; means operating in response to said first and third signals for separately detecting the existence of an external disturbance or a local defect; and means operating in response to said detecting means for increasing a gain of said servo circuit above a normal gain level in the case of an external disturbance and reducing said servo gain below said normal value in the case of a local defect.

2. The three-beam type optical data disk player as claimed in claim 1, wherein said detecting means comprises: means for forming a signal representing a difference between said first and third signals, and means for comparing said difference with a predetermined level to thereby detect the presence of an external disturbance.

3. The three-beam type optical data disk player as claimed in claim 1, wherein said detecting means comprises means for detecting when a disturbance in said first signal occurs prior to a disturbance occurring in at least one of said second and third signals, thereby to detect the presence of a disturbance due to a local defect.

4. The three-beam type optical data disk player as claimed in claim 1, wherein said servo circuit comprises a radial servo circuit.

5. The three-beam type optical data disk player as claimed in claim 1, wherein said servo circuit comprises a focus servo circuit.

6. The three-beam type optical data disk player as claimed in claim 1, wherein said servo circuit comprises a radial servo circuit and a focus servo circuit.

7. A three-beam type optical data disk player comprising:
an addition circuit for subjecting to addition a low frequency component of an output signal produced in response to a front beam and a low frequency component of an output signal produced in response to a rear beam;
a differential amplifier for obtaining a difference between said low frequency components:
a first detection circuit for detecting when an output of said differential amplifier is larger than a first predetermined detection level;
a second detection circuit for detecting when an output of said addition circuit is larger than a second predetermined detection level;
at least one servo circuit having a servo gain of one of a first predetermined servo gain value, a second servo gain value larger than said first servo gain value, and a third servo gain value smaller than said first servo gain value, said servo gain being determined according to first, second and third control signals externally applied to said servo circuit; and
control circuit means receiving outputs of said first and second detection circuits for applying to said servo circuit said second control signal for setting said servo gain of said servo circuit to said second servo gain value when only said first detection circuit provides an output, said third control signal for setting said servo gain of said servo circuit to said third servo gain value when said first and second detection circuits provide outputs, and said first control signal for setting said servo gain of said servo circuit to said first servo gain value when neither of said first and second detection circuits provides an output.

8. The three-beam type optical data disk player as claimed in claim 7, wherein said servo circuit comprises a radial servo circuit.

9. The three-beam type optical data disk player as claimed in claim 7, wherein said servo circuit comprises a focus servo circuit.

10. The three-beam type optical data disk player as claimed in claim 7, wherein said servo circuit comprises a radial servo circuit and a focus servo circuit.

* * * * *